US008245131B2

(12) United States Patent
Chao et al.

(10) Patent No.: US 8,245,131 B2
(45) Date of Patent: Aug. 14, 2012

(54) CONSTRAINING LAYOUT VARIATIONS FOR ACCOMMODATING VARIABLE CONTENT IN ELECTRONIC DOCUMENTS

(75) Inventors: Hui Chao, San Jose, CA (US); Xiaofan Lin, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2368 days.

(21) Appl. No.: 11/055,744

(22) Filed: Feb. 10, 2005

(65) Prior Publication Data

US 2006/0179405 A1    Aug. 10, 2006

(51) Int. Cl.
*G06F 17/00* (2006.01)

(52) U.S. Cl. .................................... 715/243

(58) Field of Classification Search .................. 715/200, 715/234, 235, 243–248, 253
See application file for complete search history.

(56) References Cited

U.S. PATENT DOCUMENTS

| | | | |
|---|---|---|---|
| 5,438,657 A | | 8/1995 | Nakatani |
| 5,459,827 A | | 10/1995 | Allouche et al. |
| 5,555,362 A | | 9/1996 | Yamashita et al. |
| 5,784,487 A | | 7/1998 | Cooperman |
| 5,893,127 A | * | 4/1999 | Tyan et al. ..................... 715/209 |
| 5,987,171 A | | 11/1999 | Wang |
| 6,915,484 B1 | * | 7/2005 | Ayers et al. ..................... 715/234 |
| 7,085,999 B2 | * | 8/2006 | Maeda et al. ................. 715/236 |
| 7,171,617 B2 | * | 1/2007 | Harrington et al. ........... 715/255 |
| 2002/0095443 A1 | * | 7/2002 | Kovack ........................... 707/513 |
| 2003/0229845 A1 | | 12/2003 | Salesin et al. |
| 2004/0019850 A1 | | 1/2004 | Purvis et al. |
| 2004/0019851 A1 | | 1/2004 | Purvis et al. |
| 2004/0025109 A1 | * | 2/2004 | Harrington et al. ........... 715/500 |
| 2004/0194035 A1 | | 9/2004 | Chakraborty |
| 2004/0205472 A1 | | 10/2004 | Purvis |
| 2005/0207666 A1 | * | 9/2005 | Bottou et al. ................. 382/243 |
| 2005/0210371 A1 | * | 9/2005 | Pollock et al. ................. 715/509 |
| 2005/0223319 A1 | * | 10/2005 | Ohashi et al. ................. 715/517 |

OTHER PUBLICATIONS

Philip N. Smith et al., "Towards structured, block-based PDF," Electronic Publishing, vol. 8(2&3), 153-165 (Jun. & Sep. 1995).
George Nagy, "A prototype document image analysis system for technical journals," IEEE Computer 25, pp. 10-22, Jul. 1992.
William S. Lovegrove et al., "Document analysis of PDF files: methods, results and implications," Electronic Publishing, vol. 8(2&3), 207-220 (Jun. & Sep. 1995).
Hui Chao, "Background pattern recognition in multi-page PDF document," 3rd Int'l Workshop on Document Layout Interpretation and its Applications, DLIA2003 (2003).
Hui Chao, "PDF document layout study with p. elements and bounding boxes," Int'l Workshop on Document Layout Interpretation and its Applications, DLIA2001 (2001).
Hui Chao et al., "Layout and Content Extraction for PDF Documents," DAS2004, Florence, Italy, 12 pages (Sep. 8-10, 2004).

\* cited by examiner

*Primary Examiner* — Adam M Queler (57) ABSTRACT

Methods, systems and machine-readable instructions for constraining layout variations for accommodating variable content in electronic documents are described. In one aspect, explicit logical blocks extracted from the electronic document are received. Each of the explicit logical blocks corresponds to a content region of the electronic document assigned a respective content style. Layout relationships among the explicit logical blocks are determined. Based on the layout relationships, rules constraining layout variations among implicit logical blocks to approximate the electronic document in appearance while accommodating variable content are generated. Each of the implicit logical blocks corresponds to a respective one of the explicit logical blocks and accommodates variable content having the content style assigned to the corresponding explicit logical block. The rules are stored in a machine-readable medium.

34 Claims, 10 Drawing Sheets

CONSTRAINING LAYOUT VARIATIONS FOR ACCOMMODATING VARIABLE CONTENT IN ELECTRONIC DOCUMENTS

BACKGROUND

Electronic documents are created in many different ways. For example, desktop application programs, such as Microsoft Word, Quark Design, and Adobe InDesign, frequently are used to create electronic documents. These electronic documents contain various types of content arranged with a particular layout and style.

Oftentimes, it is desirable to preserve the graphic appearance of an electronic document. Image-based formats, such as TIFF, GIF, JPEG and the Portable Document Format (PDF), preserve the appearance of electronic documents. Electronic documents stored in such image-based formats, however, typically have large storage requirements. To reduce these storage requirements, many document analysis approaches have been developed for separating the structure of electronic documents that are stored in an image-based format from their contents. The structural information may be used to infer a semantic context associated with various contents in the electronic document or to convert the electronic documents into an editable file format.

Template-based electronic document formats describe a predefined layout arrangement of fields that are capable of accepting variable content. In some approaches, the size, shape and placement of the template fields are fixed. In another approach, an electronic document is represented as a template that contains predefined content areas whose positions and sizes may be varied within specified ranges. In particular, the content areas are defined by variables with respective value domains that define the size, position, and content of the content areas. A user specifies constraints that limit variable ranges and define relationships between variables and values. A constraint solver generates a final document that satisfies all of the specified constraints.

None of the above-described approaches, however, provides a way to automatically capture the graphic appearance of an electronic document in a way that is capable of accommodating variable content.

SUMMARY

In one aspect, the invention features a machine-implemented method of processing an electronic document. In accordance with this inventive method, explicit logical blocks extracted from the electronic document are received. Each of the explicit logical blocks corresponds to a content region of the electronic document assigned a respective content style. Layout relationships among the explicit logical blocks are determined. Based on the layout relationships, rules constraining layout variations among implicit logical blocks to approximate the electronic document in appearance while accommodating variable content are generated. Each of the implicit logical blocks corresponds to a respective one of the explicit logical blocks and accommodates variable content having the content style assigned to the corresponding explicit logical block. The rules are stored in a machine-readable medium.

The invention also features a system and machine-readable instructions for implementing the above-describe electronic document processing method.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

The embodiments described in detail below provide ways of automatically capturing and expressing the graphic appearance of an electronic document in ways that allow the graphic appearance to be preserved in documents that contain different content. In particular, these embodiments automatically determine layout relationships among explicit logical blocks that are extracted from an electronic document. Based on these relationships, these embodiments automatically generate rules constraining layout variations among implicit logical blocks to approximate the electronic document in appearance while accommodating variable content. In this way, the embodiments enable the look and feel of an electronic document to be preserved in derivative electronic documents that have different contents. In variable data printing applications, for example, these embodiments may be used to create personalized direct mail pieces that contain unique information that is customized for each recipient while maintaining the same look and feel across all of the mail pieces.

I. General Framework

Figure 1:
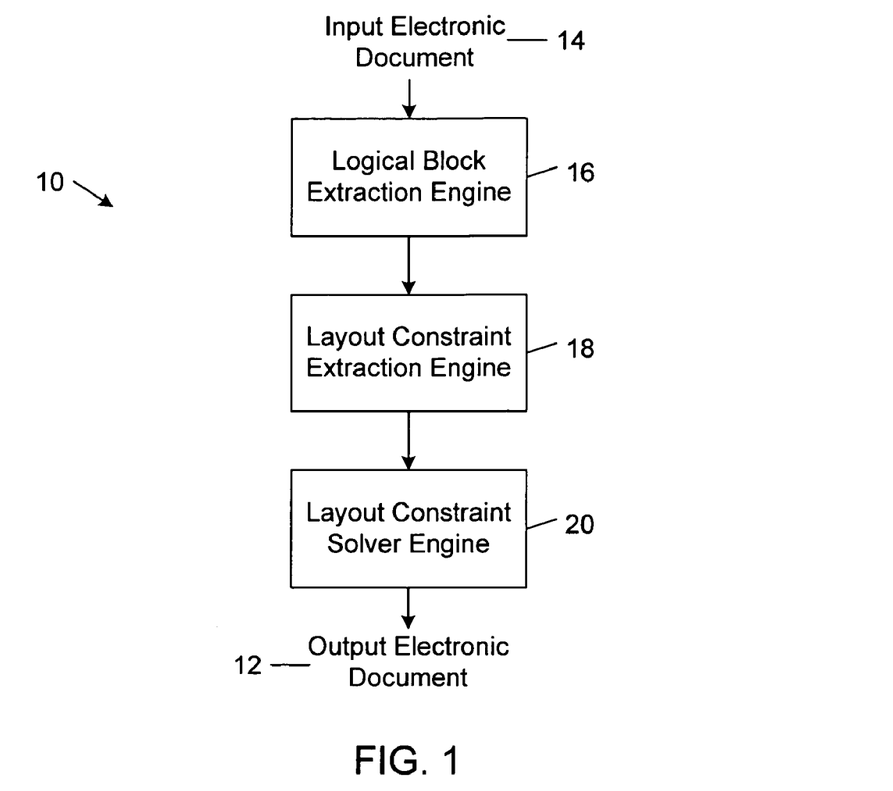
FIG. 1 is a block diagram of an embodiment of a system for processing an electronic document.

FIG. 1 shows an embodiment of an electronic document processing system 10 for generating an output electronic document 12 having substantially the same look and feel as an input electronic document 14 but containing different content.

In general, the input electronic document 14 and the output electronic document 12 may be any type of electronic document, including editable markup document (e.g., an Adobe FrameMaker document, a rich text format document, or a Microsoft Word document), formatted markup documents (e.g., an Adobe PDF document or an Adobe PostScript document), and rendered image documents (e.g., a bit map image document). Each of the input electronic document 14 and the output electronic document may contain one or more pages of content. In the illustrated embodiment, the electronic document processing system 10 processes the input electronic document 14 on a page-by-page basis; although in some implementations, the electronic document processing system 10 may process a page of input electronic document 14 based on information obtained from an analysis of one or more other pages of the input electronic document 14.

The electronic document processing system 10 includes a logical block extraction engine 16, a layout constraint generation engine 18, and a layout constraint solver engine 20. These engines 16-20 may be implemented in any computing or processing environment, including in digital electronic circuitry or in computer hardware, firmware, or software. In some embodiments, the logical block extraction engine 16, the layout constraint generation engine 18, and the layout constraint solver engine 20 are implemented by one or more respective software modules that are executed on a computer. The layout constraint solver 20 may be implemented by any one of a wide variety of different constraint solving systems. In the illustrated embodiments, the layout constraint solver 20 is implemented by a simplex-based linear solver system.

Figure 2:
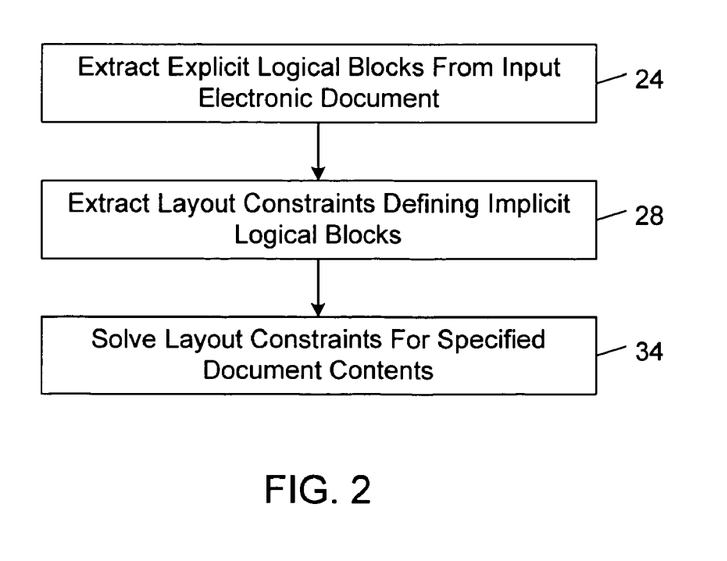
FIG. 2 is a flow diagram of an embodiment of a method of processing an electronic document.
Figure 3:
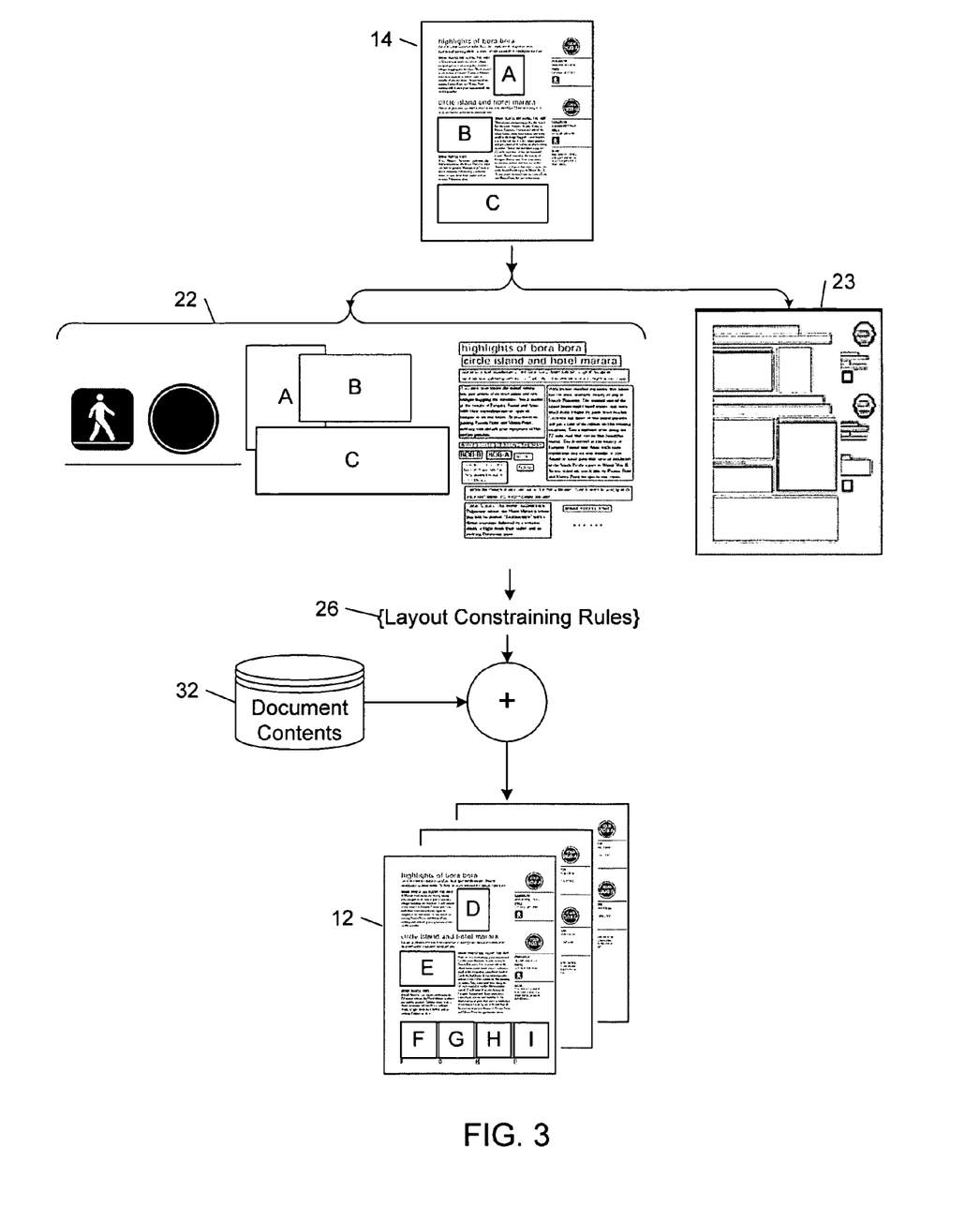
FIG. 3 is a diagrammatic view of data flow in the electronic document processing method of FIG. 2.

Referring to FIGS. 2 and 3, in one embodiment, the electronic document processing system 10 generates the output electronic document 12 based on an analysis of the input electronic document 14 and on specified document content, as follows.

The logical block extraction engine 16 initially extracts explicit logical blocks 22 and their layout 23 from the input electronic document 14 (block 24). In this process, the logical block extraction engine 16 identifies different explicit logical blocks in the input electronic document 14. In particular, the input electronic document 14 contains homogeneous regions having respective contents (e.g., text, images, or vector graphics) that are arranged with a particular layout and presented with a particular style. The logical block extraction engine 16 identifies these homogeneous regions as explicit logical blocks, separates the layout of the explicit logical blocks from their contents, and extracts the layout style of the identified logical blocks. The term "logical block" refers to a region of content in the electronic document that is determined to have a homogenous content style and a homogenous semantic context (e.g., document title, header, and paragraph for logical blocks containing textual content). The word "explicit" refers to the fact that the logical blocks in the input electronic document 14 are fully determined in terms of layout, style, and content.

After the explicit logical blocks 22 and their layout 23 have been extracted from the input electronic document 14 (block 24), the layout constraint generation engine 18 generates rules 26 that define implicit logical blocks (block 28). Each of the implicit logical blocks corresponds to a respective one of the explicit logical blocks and can accommodate variable content having the content style assigned to the corresponding explicit logical block. The word "implicit" refers to the fact that the layout constraining rules 26 merely define some of the attributes of potential logical blocks; they do not assign contents nor final position coordinates to the logical blocks and therefore do not fully determine the logical blocks.

After the layout constraining rules 26 have been generated (block 28), the layout constraint solver engine 20 generates the output electronic document 12 by solving the layout constraints for a specified set of document contents 32 that are assigned to the implicit logical blocks (block 34). As shown in FIG. 3, multiple customized output electronic documents may be generated based on the layout constraining rules 26 simply by changing the document contents assigned to the implicit logical blocks.

II. Extracting Explicit Logical Blocks

In general, the logical block extraction engine 16 may extract explicit logical blocks from the input electronic document 14 by executing any type of logical block extraction process that segments an electronic document into logical components, separates the layout of the explicit logical blocks from their contents, and extracts a layout style of the identified logical blocks.

Figure 4:
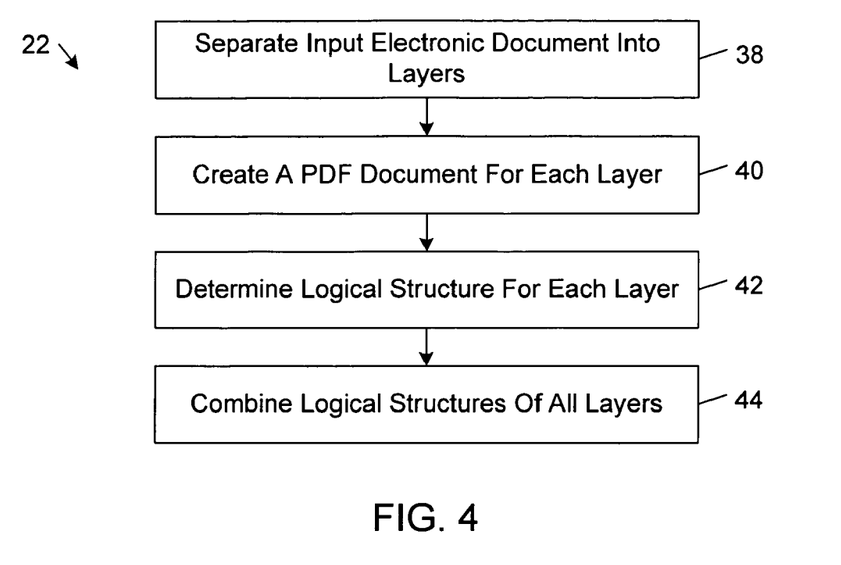
FIG. 4 is a flow diagram of an embodiment of a method of extracting explicit logical blocks from an input electronic document.
Figure 5:
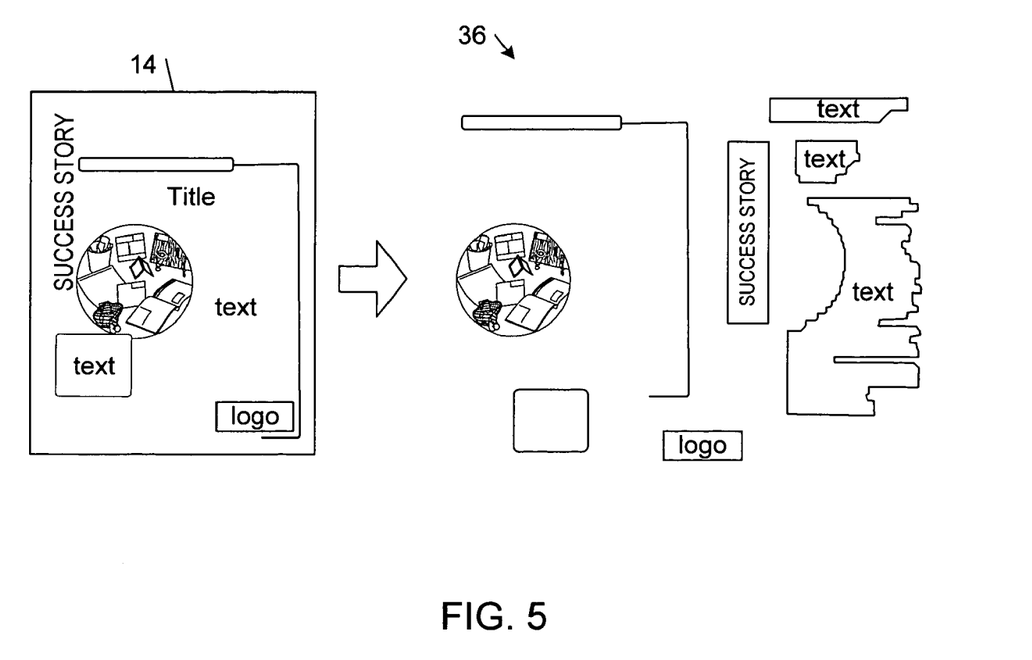
FIG. 5 is a diagrammatic view of an exemplary electronic document and a set of explicit logical blocks extracted from the electronic document in accordance with the method of FIG. 4.

Referring to FIGS. 4 and 5, in one exemplary implementation, logical block extraction engine 16 extracts explicit logical blocks 24 from an input electronic document 14, as follows. In this implementation, the input electronic document 14 is encoded in the PDF file format, which includes tags for text objects, image objects, and path objects (i.e., vector graphic objects).

In accordance with this implementation, the logical block extraction engine 16 separates the input electronic document 24 into layers 36 based on content type (block 38). The layers may include a text layer, an image layer, and a vector graphics layer. A separate PDF document is created for each of the layers (block 40).

A logical structure is determined for each of the layers (block 42). The logical structure describes to the content, layout structure, and layout style of the explicit logical blocks in a given layer. The layout style of a logical block is described by a style attribute vector, which includes an indication of the content type (e.g., text, image, or vector graphic) and a set of style attributes. In one implementation, the style attributes describe: font size, font family, color, orientation, bounding box coordinates, and outline polygon coordinates for textual content; the aspect ratio, the shape, the bounding box coordinates, and outline polygon coordinates for image content; and bounding box coordinates and outline polygon coordinates for vector graphic content. The "outline polygon" of a logical block corresponds to a polygon that encompasses and traces the outline of the content of the logical block. The "bounding box" of a logical block refers to the smallest rectangle with vertical and horizontal sides that encompasses the outline polygon of the logical block.

The logical structures of each of the layers are combined to determine the logical structures of all of the layers 36 of the input electronic document 14 (block 44). In this process, the logical block extraction engine 16, determines the relative positions (page coordinates) of the explicit logical blocks of the explicit logical blocks and associates with each logical block a layer index, which determines the order in which the logical blocks are laid down on the pages of the input electronic document 14. The information (e.g., logical block content, layout, style, relative positions, and layering order) that is extracted from the input electronic document 14 may be described in XML (extensible Markup Language) and stored in a machine-readable medium.

Additional details regarding the explicit logical block extraction method of FIG. 4 may be obtained from U.S. patent application Ser. No. 10/787,971, which was filed Feb. 27, 2004, by Hui Chao et al. and is entitled "Method for Determining Logical Components of a Document."

III. Generating Rules Constraining Layout Variations

Figure 6:
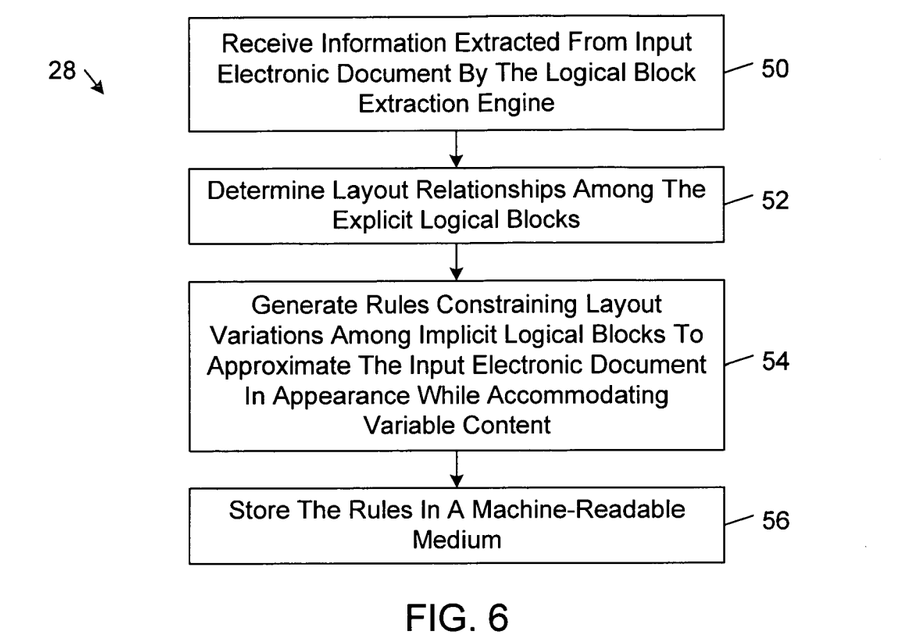
FIG. 6 is a flow diagram of an embodiment of a method of generating rules constraining layout variations among implicit logical blocks to approximate the electronic document in appearance while accommodating variable content.

As explained above, after the explicit logical blocks 22 and their layout 23 have been extracted from the input electronic document 14 (block 24; FIG. 2), the layout constraint generation engine 18 generates rules 26 that define implicit logical blocks (block 28; FIG. 2). FIG. 6 shows an embodiment of a method by which the layout constraint generation engine 18 generates these layout constraining rules 26.

The layout constraint generation engine 18 receives the information that is extracted from the input electronic document 14 by the logical block extraction engine 16, including logical block content, layout, style, relative positions, and layering order of the explicit logical blocks (block 50).

The layout constraint generation engine 18 then determines layout relationships among the explicit logical blocks (block 52). As explained in detail below, among these layout relationships are gap relationships, overlap relationships, embedding relationships, and alignment relationships. The layout constraint generation engine 18 also determines relationships between the explicit logical blocks and the pages of the input electronic document 14, including page margins, content bleeding, and repetitive patterns.

Based on the determined layout relationships (block 52), the layout constraint generation engine 18 generates the rules 26 constraining layout variations among implicit logical blocks to approximate the input electronic document 14 in appearance while accommodating variable content (block 54). Each of the implicit logical blocks corresponds to a respective one of the explicit logical and accommodates variable content having the content style that is assigned to the explicit logical block.

In general, the rules that are generated by the layout constraint extraction engine may be expressed in any suitable mathematical form that is capable of describing the layout and geometric relations among the implicit logical blocks, such as above, below, left of, right of, inside, and overlaps. In the illustrated embodiments, the layout constraining rules 26 correspond to linear equality and inequality objectives and constraints.

The layout constraint extraction engine 18 associated with each rule a strength label that is used by the layout constraint solver engine 20 to prioritize constraints when all of the constraints cannot be satisfied in a given layout of implicit logical blocks. The strength labels are selected from a predefined strength hierarchy that compasses strength labels for required constraints and non-required constraints. In one exemplary implementation, the strength hierarchy consists of the following strength labels in order of priority: required, strong, and weak. Rules that are associated with a "required" strength label are referred to herein as "required rules" and rules that are associated with "strong" or "weak" strength labels are referred to herein as "non-required rules".

The layout constraint generation engine 18 stores the layout constraining rules 26 in a machine-readable medium (block 56).

A. Layering Order

Figure 7:
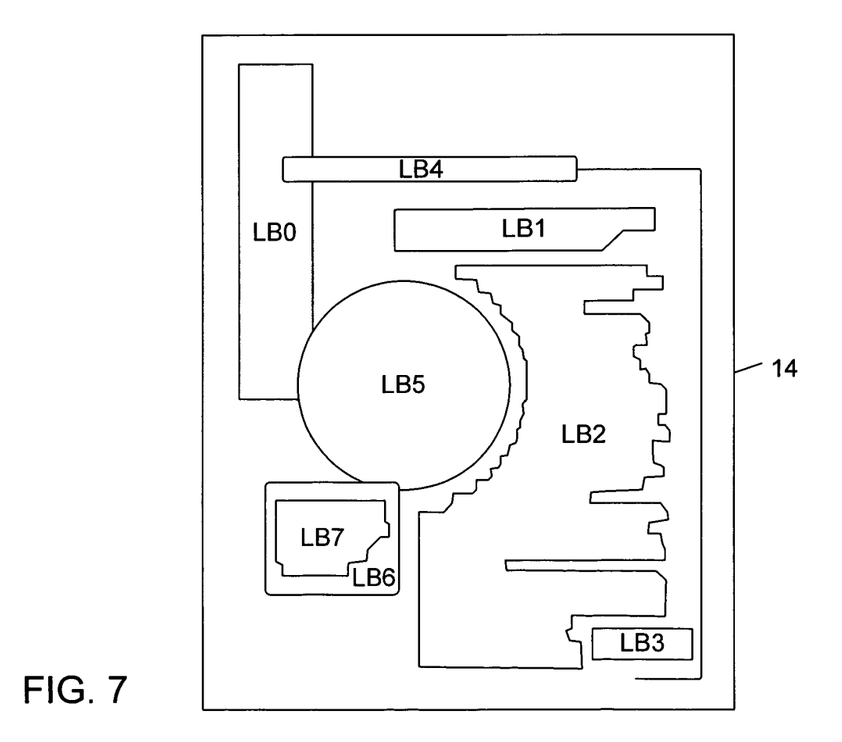
FIG. 7 shows layout relationships among explicit logical blocks extracted from an exemplary electronic document.

FIG. 7 shows an exemplary input electronic document 14 that includes a set of explicit logical blocks that are laid out on the page in accordance with the layer index associated with each of the explicit logical blocks. In particular, a logical block with a lower layer index value is placed on the page before logical blocks with higher layer index values. For example, the explicit logical blocks shown in FIG. 7 may have layer index values LB0-LB7 that are ordered as follows:

$$LB0<LB1<LB2<LB3<LB4<LB5<LB6<LB7 \quad (1)$$

With respect to the layering order, the layout constraint extraction engine 18 determines the layering order of the explicit logical blocks from the associated layer index values (block 52; FIG. 6). The layout constraint extraction engine 18 generates a required rule preserving the layering order in layouts of the implicit logical blocks (block 54; FIG. 6).

B. Gaps Between Adjacent Logical Blocks

Figure 8:
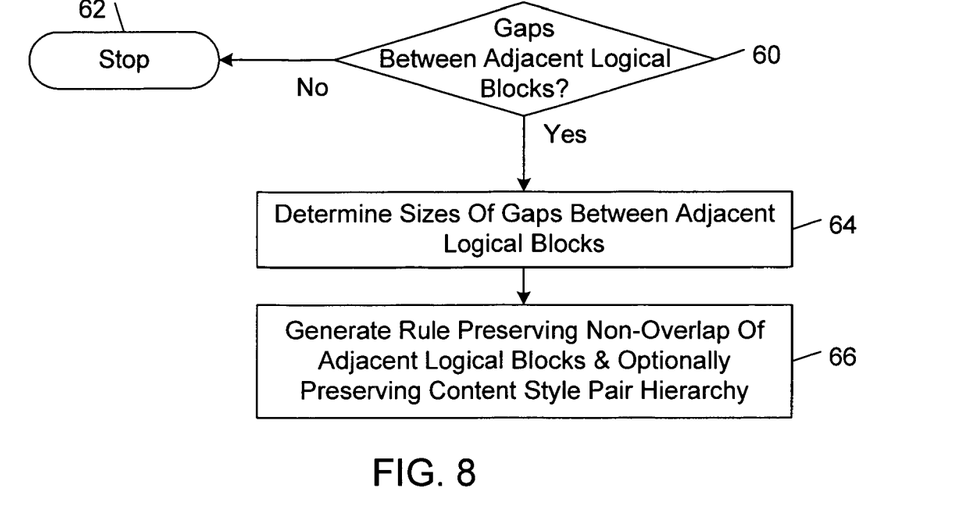
FIG. 8 is a flow diagram of an embodiment of a method of generating rules constraining variations in gaps between adjacent implicit logical blocks.

FIG. 8 shows an embodiment of a method by which the layout constraint extraction engine 18 generates layout constraining rules for gaps between implicit logical blocks.

Figure 9A:
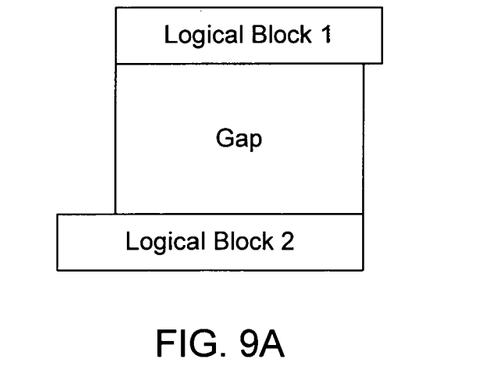
FIG. 9A shows an exemplary pair of adjacent logical blocks.
Figure 9B:
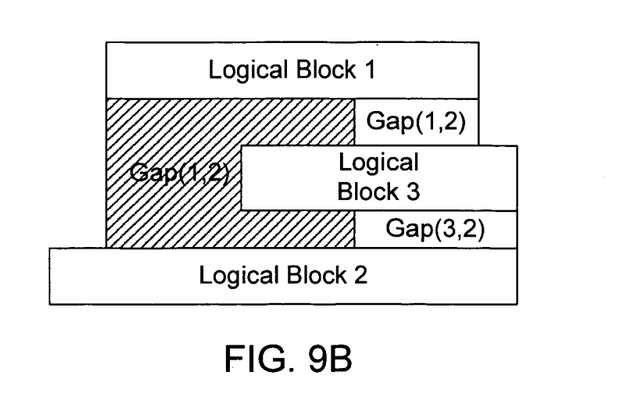
FIG. 9B shows an exemplary set of three logical blocks.

In accordance with this method, the layout constraint extraction engine 18 determines whether there are gaps between adjacent ones of the explicit logical blocks (block 60). In this regard, the layout constraint extraction engine 18 initially identifies pairs of adjacent ones of the explicit logical blocks. Two explicit logical blocks are adjacent if there are no other explicit logical blocks located in the gap between the explicit logical blocks. The gap corresponds to the area that is bounded horizontally or vertically by both of the explicit logical blocks. The explicit logical blocks are "horizontally adjacent" if the gap is located between the adjacent horizontal sides of the bounding boxes of the explicit logical blocks, whereas the explicit logical blocks are "vertically adjacent" if the gap is located between the adjacent vertical sides of the bounding boxes of the explicit logical blocks. In the exemplary layout shown in FIG. 9A, Logical Block 1 and Logical Block 2 are horizontally adjacent because there are no explicit logical blocks located in the Gap and the Gap is located between the horizontal sides of the bounding boxes of the logical blocks. In the exemplary layout shown in FIG. 9B, Logical Block 1 and Logical Block 2 are not adjacent because Logical Block 3 is located in the Gap(1,2). Logical Block 3, however, is horizontally adjacent to both Logical Block 1 and Logical Block 2.

If the layout constraint extraction engine 18 determines that there are no gaps between adjacent ones of the explicit logical blocks (block 60), the process stops (block 62). Otherwise, the layout constraint extraction engine 18 determines the sizes of the gaps between adjacent ones of the explicit logical blocks (block 64).

The gaps between different logical blocks on a document page are affected by the design intention and the current content in the logical blocks. In the exemplary layout shown in FIG. 10, from visual observation it can be inferred that both Text Block 1 and Text Block 2 should have the same gap constraints with regard to the image block at the bottom. However, because text content in Text Block 2 makes the bottom edge of its bounding box slightly higher than the bottom edge of the bounding box of Text Block 1, the gap (Gap 2) between Text Block 2 and the Image Block 2 is slightly larger than the gap (Gap 1) between block Text Block 1 and the Image Block 2.

Figure 10:
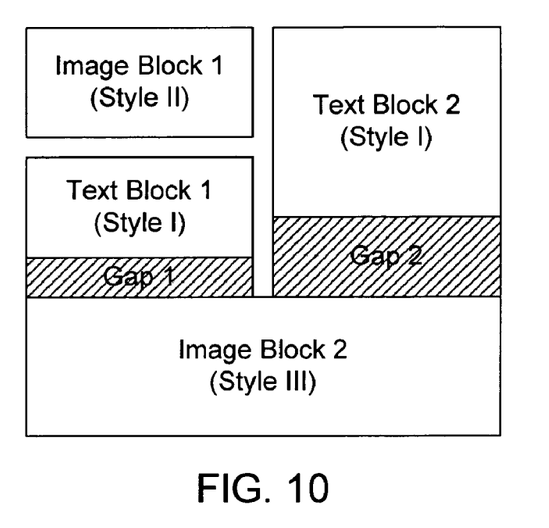
FIG. 10 shows two text logical blocks of the same style that are adjacent to a common image logical block.

To discover the layout constraints for the intended gaps, the layout constraint extraction engine 18 generates a look-up table that describes the inferred sizes of the intended gaps between adjacent ones of the explicit logical blocks based on style type. As explained above, the style of a logical block is described with a style attribute vector. In FIG. 10, both Text Block 1 and Text Block 2 have same style (Style I), the style of Image Block 1 is Style II, and the style of Image Block 2 is Style III, which is different from the style of Image Block 1 (e.g., because Image Block 1 and Image Block 2 have different aspect ratios). Tables 1 and 2 list the rules for determining the intended horizontal and vertical gap sizes between explicit logical blocks of Style A and B.

TABLE 1

HORIZONTAL GAPS

| | STYLE ON RIGHT | |
|---|---|---|
| STYLE ON LEFT | STYLE A | STYLE B |
| STYLE A | Gap(A, A): shortest horizontal gap between two blocks of Style A | Gap(A, B): shortest horizontal gap between two blocks with Styles A and B |
| STYLE B | Gap(B, A): shortest horizontal gap between two blocks with Styles A and B | Gap(B, B): shortest horizontal gap between two blocks of Style B |

TABLE 2

VERTICAL GAPS

| | STYLE ON BOTTOM | |
|---|---|---|
| STYLE ON TOP | STYLE A | STYLE B |
| STYLE A | Gap(A, A): shortest vertical gap between two blocks of Style A | Gap(A, B): shortest vertical gap between two blocks with Styles A and B |
| STYLE B | Gap(B, A): shortest vertical gap between two blocks with Styles A and B | Gap(B, B): shortest vertical gap between two blocks of Style B |

When applied to the exemplary layout shown in FIG. 10, Table 2 provides that the intended gap between logical blocks of Style I and Style III is given by min(Gap1, Gap2)=Gap 1.

Referring back to FIG. 8, after the sizes of the gaps between adjacent ones of the explicit logical blocks have been determined (block 64), the layout constraint extraction engine 18 generates rules preserving non-overlap of adjacent ones of the implicit logical blocks (block 66). In particular, the layout constraint extraction engine 18 generates rules that specify preservation of the determined gap sizes with a strength label "strong" and rules that require that implicit logical blocks corresponding to explicit logical blocks with gaps therebetween do not overlap. For example, with respect to the exemplary layout of FIG. 10, the layout constraint extraction engine 18 may generate the following set of gap-related rules:

<constraint rule="$TB1\_bottom \geq IB2\_top$"
    strength="required"/>

<constraint rule="$TB2\_bottom \geq IB2\_top$"
    strength="required"/>

<constraint rule="$TB1\_bottom - IB2\_top = Gap\ 1$"
    strength="strong"/>

<constraint rule="$TB2\_bottom - IB2\_top \geq Gap\ 1$"
    strength="strong"/>

<constraint rule="$TB2\_bottom - IB2\_top \leq Gap\ 2$"
    strength="strong"/> where TB1 refers to Text Block 1, TB2 refers to Text Block 2, and IB2 refers to Image Block 2.

In some implementations, the layout constraint extraction engine 18 optionally preserves the content style pair hierarchy of the input electronic document 14. In particular, all of the gaps between the explicit logical blocks in the input electronic document 14 are sorted according to their sizes and content style pairs (e.g., Gap(I, II)>Gap(II, II)>Gap(II, I)). The layout constraint extraction engine 18 generates rules specifying that the hierarchy of the content style gap sizes should not be changed in the final layouts of the logical blocks determined by the layout constraint solver engine 20—although the original gap sizes may vary by a predetermined amount (e.g., ±10%).

C. Overlapping Logical Blocks

Figure 11:
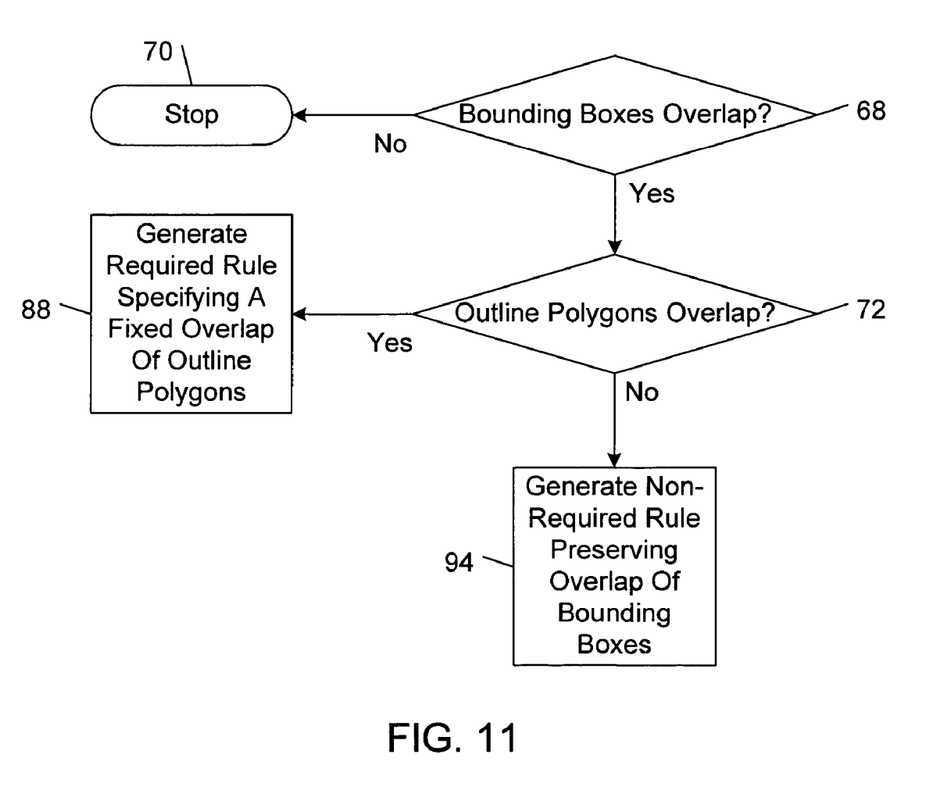
FIG. 11 is a flow diagram of an embodiment of a method of generating rules constraining overlap variations between overlapping implicit logical blocks.

FIG. 11 shows an embodiment of a method by which the layout constraint extraction engine 18 generates layout constraining rules for overlapping ones of the implicit logical blocks.

In accordance with this method, the layout constraint extraction engine 18 determines whether the bounding boxes of the corresponding explicit logical blocks overlap (block 68). If the bounding boxes do not overlap, the process stops (block 70). Otherwise, the layout constraint extraction engine 18 determines whether the outline polygons of the corresponding explicit logical blocks overlap (block 72).

Figure 12:
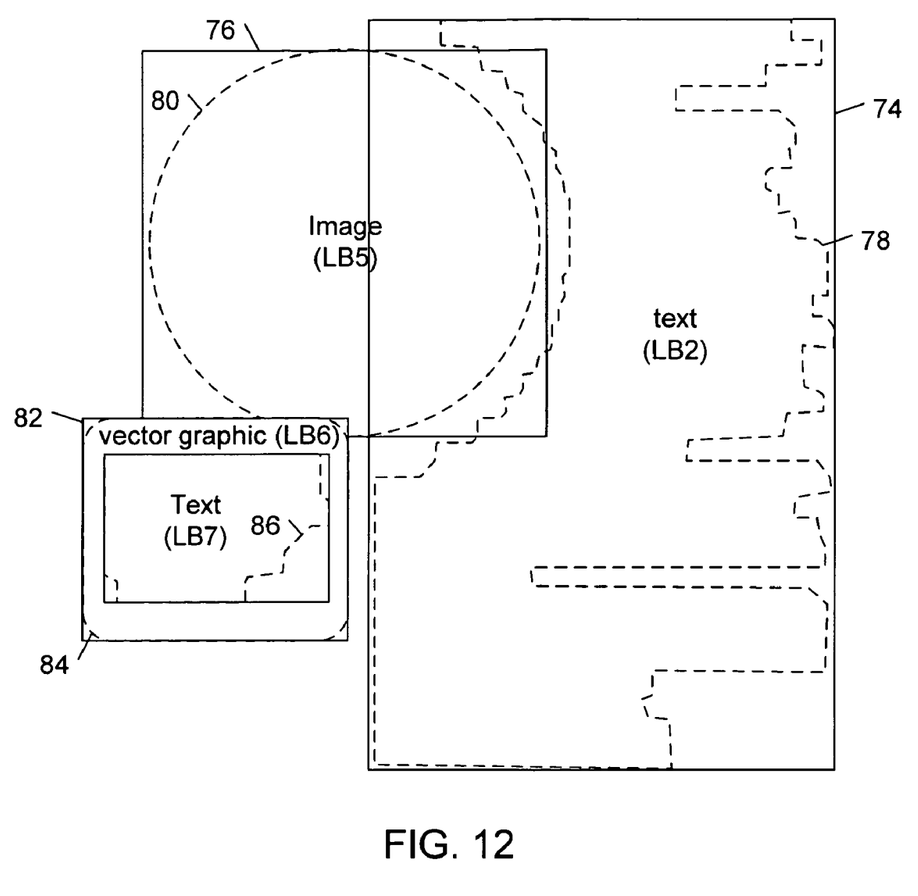
FIG. 12 shows bounding boxes and outline polygons computed for a set of explicit logical blocks extracted from an electronic document.

FIG. 12 shows the bounding boxes (solid-line rectangles) and the outline polygons (dashed-line polygons) for an exemplary layout of logical blocks. In this example, the bounding box 74 of logical block LB2 and the bounding box 76 of logical block LB5 overlap, but the outline polygons 78, 80 of LB2 and LB5 do not overlap. The bounding boxes 76, 82 of logical blocks LB5 and LB6 overlap, as do the outline polygons 80, 84 of logical blocks LB5 and LB6. It is noted that the embedded layout relationship between logical blocks LB7 and LB6 (i.e., where the outline polygon 86 of logical block LB7 is embedded within the outline polygon 84 of logical block LB6) is discussed in the next section.

Figure 13:
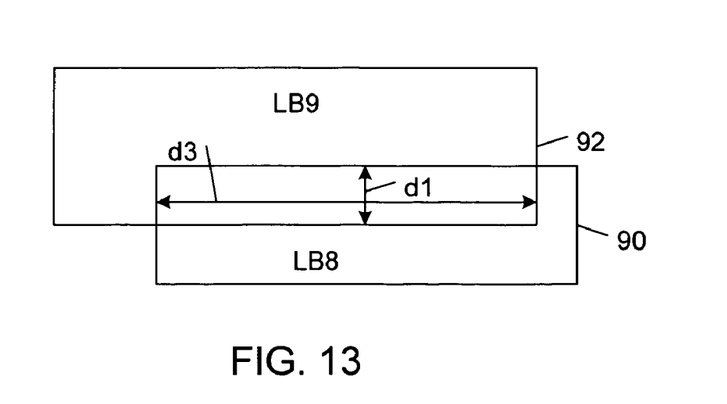
FIG. 13 shows a set of dimensions for characterizing the overlap between logical blocks.

If the outline polygons of the corresponding explicit logical blocks overlap (block 72), the layout constraint extraction engine 18 generates a rule specifying a fixed overlap of the outline polygons of the implicit logical blocks (block 88). In the exemplary layout shown in FIG. 13, the outline polygon 90 of the logical block LB 8 overlaps the outline polygon 92 for logical block LB9. With respect to this exemplary layout, the layout constraint extraction engine 18 generates a rule preserving the dimensions d1 and d3. That is:

<constraint rule="$LB8\_top - LB9\_bottom = d1$"
    strength="required">

<constraint rule="$LB9\_right - LB8\_left = d3$"
    strength="required">

If the outline polygons of the corresponding explicit logical blocks do not overlap (block 72), the layout constraint extraction engine 18 generates a non-required rule preserving the overlap of the bounding boxes of the implicit logical blocks (block 94). For example, the layout constraining rules that preserve the overlap of the bounding boxes may be assigned a "strong" strength label. In addition, the layout constraint extraction engine 18 generates a required rule preserving the relationship between the outline polygons (i.e., requiring that the outline polygons not overlap).

D. Embedded Logical Blocks

Figure 14:
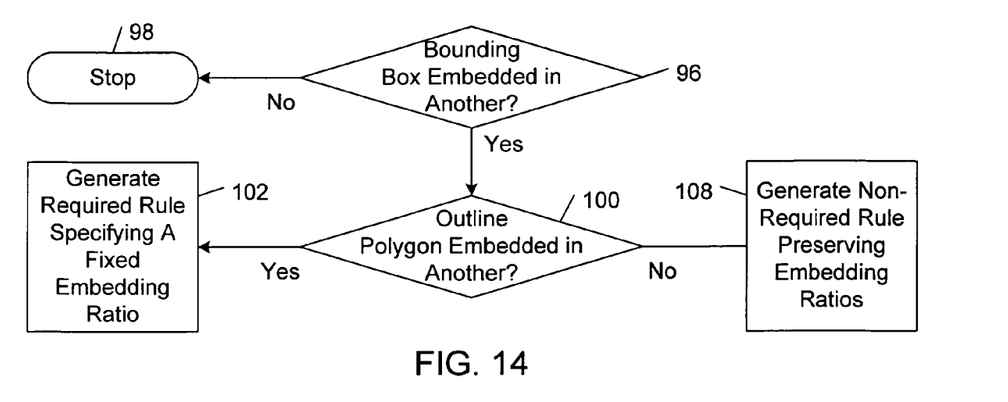
FIG. 14 is a flow diagram of an embodiment of a method of generating rules constraining embedding variations for embedded implicit logical blocks.

FIG. 14 shows an embodiment of a method by which the layout constraint extraction engine 18 generates layout constraining rules for capturing embedded relationships among the explicit logical blocks and preserving these relationships in layouts of the implicit logical blocks.

In accordance with this method, the layout constraint extraction engine 18 determines whether a bounding box of one of the corresponding explicit logical blocks is embedded within the bounding box of the other (block 96). If one of the bounding boxes is not embedded within the other, the process stops (block 98). Otherwise, the layout constraint extraction engine 18 determines whether the outline polygon of one of the corresponding explicit logical blocks is embedded within the other (block 100).

Figure 15:
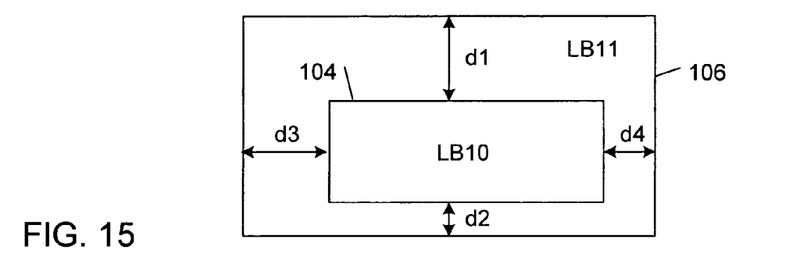
FIG. 15 shows a set of dimensions for characterizing the embedding ratio between logical blocks.

If the outline polygon of one of the corresponding explicit logical blocks is embedded in the other (block 100), the layout constraint extraction engine 18 generates a required rule specifying a fixed embedding ratio between the outline polygons of the implicit logical blocks (block 102). In the exemplary layout shown in FIG. 15, the outline polygon 104 of the logical block LB10 is embedded within the outline polygon 106 for logical block LB11. With respect to this exemplary layout, the layout constraint extraction engine 18 generates a rule preserving the embedding ratios d1/d2 and d3/d4. That is:

$$< \text{constraint rule} = \text{``}\frac{LB10\_top - LB11\_top}{LB10\_bottom - LB11\_bottom} = \frac{d1}{d2}\text{''strength} = \text{``required''}/>$$

$$< \text{constraint rule} = \text{``}\frac{LB10\_left - LB11\_left}{LB10\_right - LB11\_right} = \frac{d3}{d4}\text{''strength} = \text{``required''}/>$$

If the outline polygon of one of the corresponding explicit logical blocks is not embedded in the other (block 100), the layout constraint extraction engine 18 generates a non-required rule preserving the embedding ratios of the bounding boxes of the implicit logical blocks (block 108). For example, the layout constraining rules that preserve the embedding ratios of the bounding boxes may be assigned a "strong" strength label. In addition, the layout constraint extraction engine 18 generates a required rule preserving the relationship between the outline polygons (i.e., requiring that the outline polygons not be embedded).

E. Alignment of Logical Blocks

The layout constraint extraction engine 18 determines the alignment relationships among the explicit logical blocks and generates required rules that preserve these alignment relationships in layouts of the implicit logical blocks.

Figure 16:
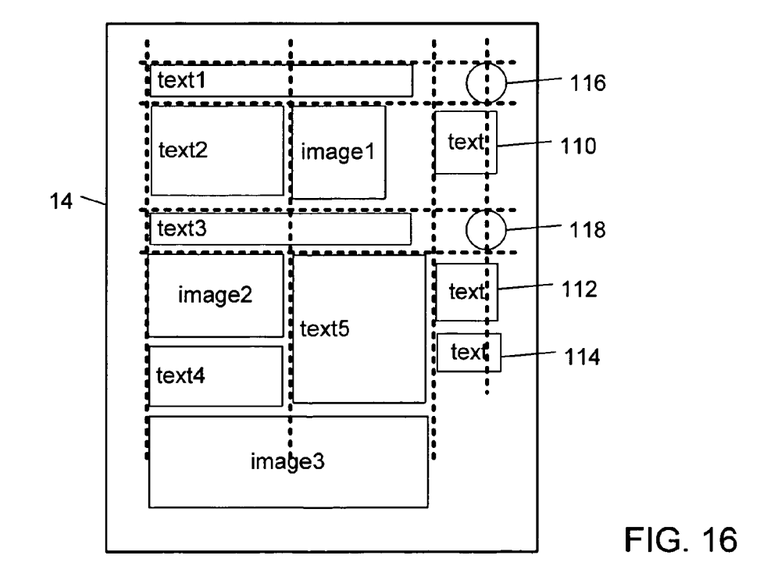
FIG. 16 shows alignment relationships among the logical blocks of an exemplary electronic document.

FIG. 16 shows an exemplary input electronic document 14 that includes a set of explicit logical blocks that are laid out on a page. With respect to this exemplary layout, the layout constraint extraction engine 18 determines that: the logical blocks text1, text2, text3, image2, text4, and image3 are left-aligned; the logical blocks image1 and text5 are left-aligned; the logical blocks 110, 112, 114 are left-aligned; and the logical blocks 116 and 118 are center aligned. In some implementations, the layout constraint extraction engine 18 generates the following layout constraining rules for the first set of left-aligned logical blocks:

<constraint rule="text1_left=468.0" strength "weak"/>

<constraint rule="text2_left=text1_left" strength "required"/>

<constraint rule="text3_left=text1_left" strength "required"/>

<constraint rule="image2_left=text1_left" strength "required"/>

<constraint rule="text4_left=text1_left" strength "required"/>

<constraint rule="image3_left=text1_left" strength "required"/>

When there are multiple alignment relationships among explicit logical blocks, the layout constraint generation engine 18 prioritizes the alignment constraints in accordance with a predefined reading order. For example, in some implementations, the alignment constraints are prioritized as follows:

Top Alignment>Bottom Alignment>Middle Alignment

Left Alignment>Right Alignment>Center Alignment

In these implementations, the layout constraint generation engine 18 assigns "required" strength labels to one of the vertical alignment constraints and one of the horizontal alignment constraints in accordance with the above prioritization of alignment constraints.

Figure 17:
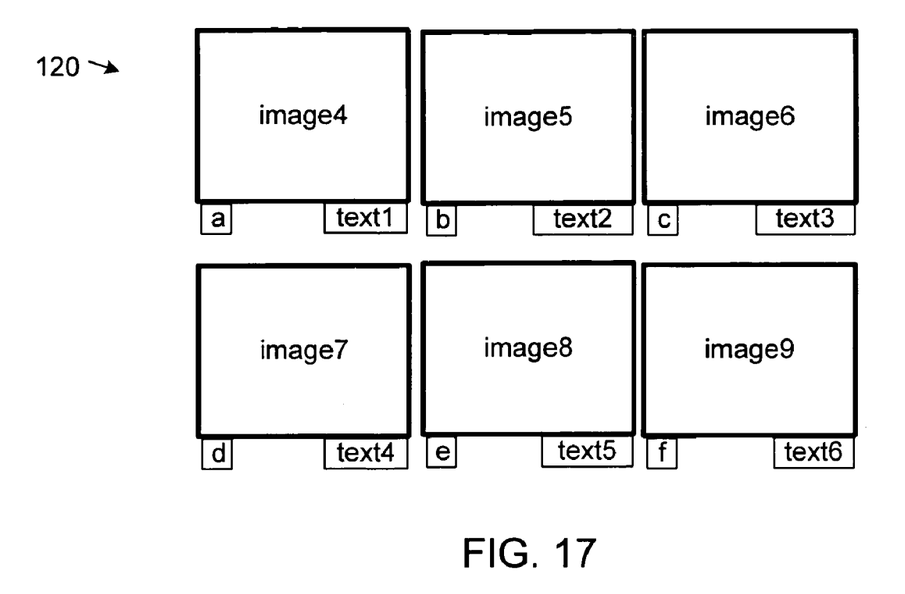
FIG. 17 shows an exemplary set of logical blocks exhibiting various types of alignment relationships.

FIG. 17 shows an exemplary layout 120 eighteen explicit logical blocks that exhibit multiple types of alignment relationships. For example, image4, image5, and image 6 are top-aligned and bottom-aligned. Similarly, image7, image8, image9 are top-aligned and bottom-aligned. Logical blocks "a", text1, "b", text2, "c", and text3 are top-aligned and bottom-aligned. Logical blocks "d", text4, "e", text5, "f", and text6 are top-aligned and bottom-aligned. Image4, "a", image7, and "d" are left-aligned. Image5, "b", image8, and "e" are left-aligned. Image6, "c", image9, and "f" are left-aligned.

Figure 18:
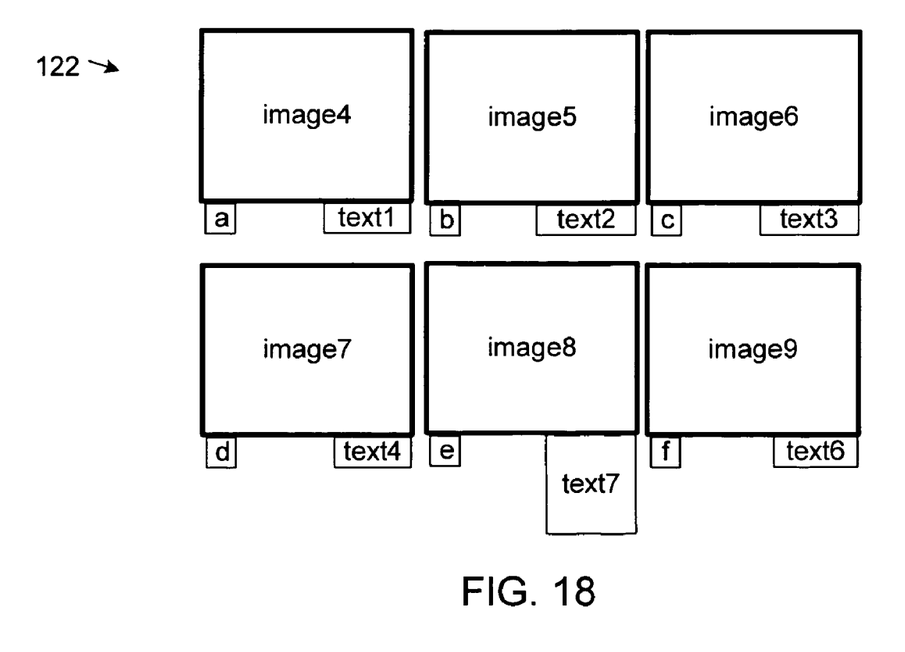
FIG. 18 shows an exemplary set of logical blocks derived from the exemplary set shown in FIG. 17 in which a bottom alignment constraint of one of the logical blocks is relaxed to accommodate additional text.

FIG. 18 shows an exemplary layout 122 of logical blocks that is derived the layout 120. The layout 122 corresponds to the layout 120, except that the logical block text5 has been replaced with a logical block text7, which occupies more vertical space than text5. With respect to this example, the layout constraint extraction engine 18 assigns a higher priority to the top alignment priority of text block5 than the bottom alignment priority. In the resulting layout, the logical block text7 remains top-aligned with the logical blocks "d", text4, "e", "f", and text6, but the bottom alignment constraint is not satisfied in order to accommodate the additional space requirements of text7. In this way, the layout constraint extraction engine 18 maintains the overall look and feel of the layout 120, while accommodating new content.

F. Margins

Figure 19:
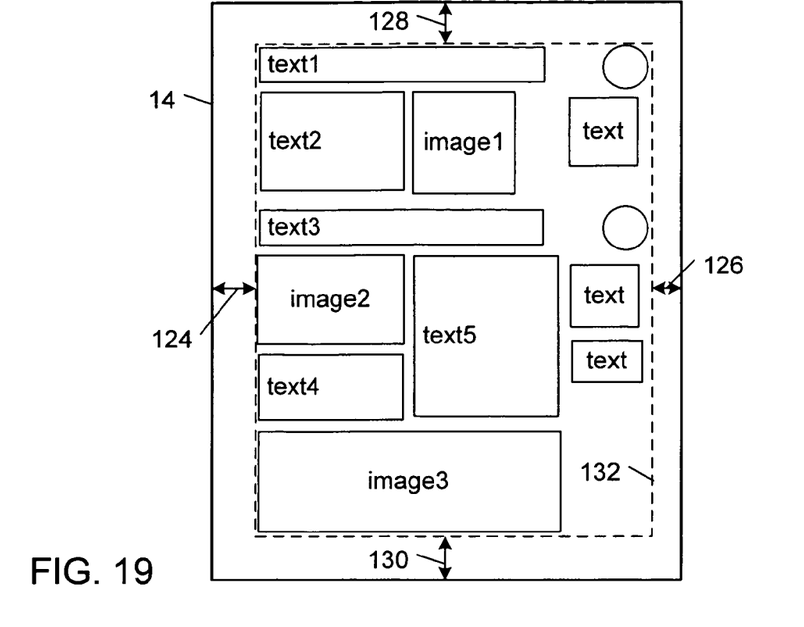
FIG. 19 shows a set of dimensions for characterizing the margins of an exemplary electronic document.

The layout constraint extraction engine 18 determines the margins separating the explicit logical blocks from edges of the electronic document. FIG. 19 shows an exemplary layout of explicit logical blocks on a page of the input electronic document 14. In some implementations, the layout constraint extraction engine 18 determines the margins 124, 126, 128, 130 by comparing the edges of the page to the corresponding edges of a bounding box 132 that encompasses all of the explicit logical blocks on the page.

The layout constraint extraction engine 18 generates a non-required rule preserving the margins in layouts of the corresponding implicit logical blocks. In some implementations, the layout constraint extraction engine 18 assigns a "weak" strength label to the margin preserving rules. In addition, the layout constraint extraction engine 18 generates a required rule preserving the relationship between the page and logical block (i.e., requiring all implicit logical blocks that correspond to explicit logical blocks inside the margin stay inside the page boundary, i.e. margin 124, 126, 128 and 130 must be large than zero).

G. Content Bleeding

The layout constraint extraction engine 18 identifies ones of the explicit logical blocks that contain content that bleeds over edges of the input electronic document 14. For example, in the exemplary layout shown in FIG. 20, the explicit logical blocks 134 and 136 have contents that bleed over the edges of the input electronic document 14.

Figure 20:
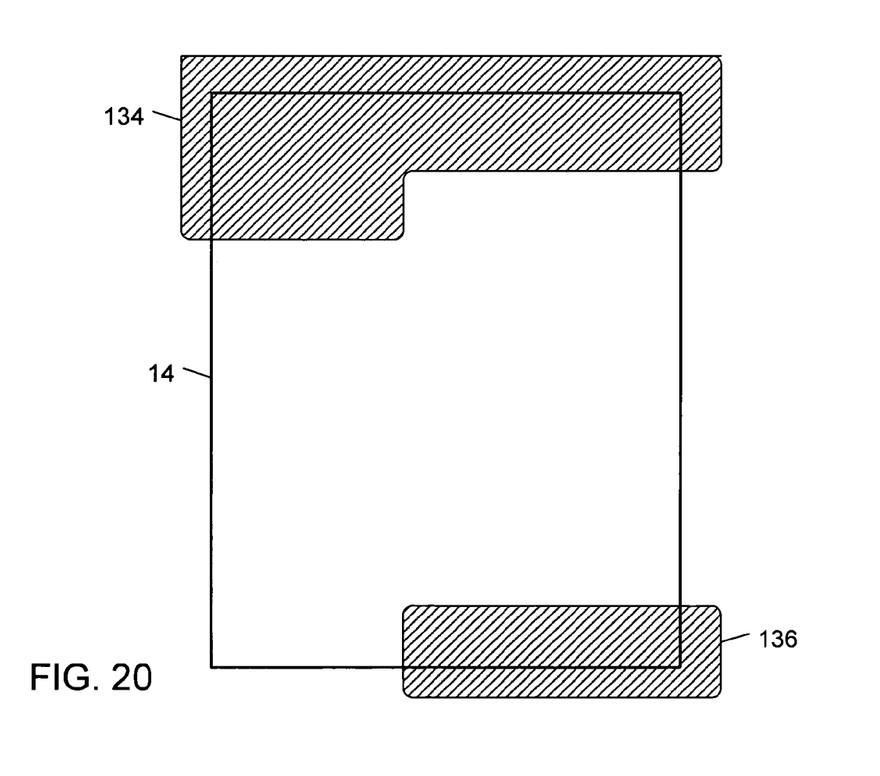
FIG. 20 shows an exemplary pair of logical blocks with content bleeding over edges of an exemplary electronic document.

The layout constraint extraction engine 18 generates rules preserving the bleeding of the content of the identified ones of the explicit logical blocks in corresponding ones of the implicit logical blocks. For example, in some implementations, the layout constraint extraction engine 18 preserves the bleeding effects in the identified explicit logical blocks by requiring that the coordinates of bleeding contents in the corresponding implicit logical blocks exceed the corresponding page boundaries of the output electronic document 12 by a predetermined, empirically-determined amount.

H. Repetitive Patterns Among Logical Blocks

In some embodiments, the layout constraint extraction engine 18 searches for patterns in the layout of the explicit logical blocks on pages of the input electronic document 14. If patterns are identified, the layout constraint extraction engine 18 generates non-required rules for preserving the identified patterns.

In some implementations, the layout constraint extraction engine 18 identifies ones of the explicit logical blocks that have the same style and equal sizes along a layout dimension of the electronic document. For example, in the exemplary layout 120 shown in FIG. 17, the explicit logical blocks image4, images, image6, image7, image8, and image9 have the same content style (e.g., image content with the same aspect ratio) and the same height and width dimensions. With respect to these logical blocks, the layout constraint extraction engine 18 would generate non-required rules that specify that the corresponding implicit logical blocks should be equal in height and width (e.g., with a "strong" strength label).

In some implementations, the layout constraint extraction engine 18 identifies explicit logical blocks that have the same style and alignment and determined whether the distances separating adjacent ones of the identified explicit logical blocks are equal. For example, in the exemplary layout 120 shown in FIG. 17, the explicit logical blocks image4, image5, and image6 have the same content style (e.g., image content with the same aspect ratio) and the same top and bottom alignment. In addition, the distances separating adjacent ones of these logical blocks are the same. Thus, with respect to these logical blocks, the layout constraint extraction engine 18 would generate non-required rules that specify that the distances separating adjacent ones of the corresponding implicit logical blocks should be equal (e.g., with a "strong" strength label).

IV. Conclusion

To summarize, the embodiments described above provide ways of automatically capturing and expressing the graphic appearance of an electronic document in ways that allow the graphic appearance to be preserved in documents that contain different content.

The electronic document processing methods described herein may be implemented in any computing or processing environment, including in digital electronic circuitry or in computer hardware, firmware, or software. These methods may be performed by a computer processor executing instructions organized, for example, into process modules to carry out these methods by operating on input data and generating output. Suitable processors include, for example, both general and special purpose microprocessors. Generally, a processor receives instructions and data from a read-only memory and/or a random access memory. Storage devices suitable for tangibly embodying computer process instructions include all forms of non-volatile memory, including, for example, semiconductor memory devices, such as EPROM, EEPROM, and flash memory devices; magnetic disks such as internal hard disks and removable disks; magneto-optical disks; and CD-ROM. Any of the foregoing technologies may be supplemented by or incorporated in specially designed ASICs (application-specific integrated circuits).

Other embodiments are within the scope of the claims.

What is claimed is:

1. A machine-implemented method of processing an electronic document, comprising:
    receiving explicit logical blocks extracted from the electronic document, each of the explicit logical blocks corresponding to a content region of the electronic document assigned a respective content style;
    determining layout relationships among the explicit logical blocks;
    based on the layout relationships, generating rules constraining layout variations among implicit logical blocks to approximate the electronic document in appearance while accommodating variable content, wherein each of the implicit logical blocks corresponds to a respective one of the explicit logical blocks and accommodates variable content having the content style assigned to the corresponding explicit logical block; and
    storing the rules in a machine-readable medium.

2. The method of claim 1, wherein the generating comprises associating with each rule a strength label selected from a predefined constraint strength hierarchy encompassing strength labels for required constraints and non-required constraints.

3. The method of claim 1, wherein the determining comprises determining a layering order of the explicit logical blocks in the electronic document.

4. The method of claim 3, wherein the generating comprises generating a required rule preserving the layering order in layouts of the implicit logical blocks.

5. The method of claim 1, wherein the determining comprises identifying gaps between adjacent ones of the explicit logical blocks.

6. The method of claim 5, wherein the generating comprises generating a rule requiring non-overlap of adjacent ones of the implicit logical blocks corresponding to adjacent ones of the explicit logical blocks having an identified gap therebetween.

7. The method of claim 5, wherein the determining comprises computing sizes of the identified gaps.

8. The method of claim 7, wherein the content styles assigned to adjacent ones of the explicit logical blocks constitute respective content style pairs, and the computing comprises determining a gap size for adjacent ones of the implicit logical blocks with a given content style pair assignment based on an analysis of gap sizes of adjacent ones of the explicit logical blocks in the electronic document with the given content style pair assignment.

9. The method of claim 8, wherein the computing additionally comprises ordering the content style pairs into a hierarchy in accordance with gap sizes determined for adjacent ones of the explicit logical blocks corresponding to different content style pairs.

10. The method of claim 9, wherein the generating comprises generating a non-required rule preserving the content style pair hierarchy in layouts of the implicit logical blocks.

11. The method of claim 7, wherein the generating comprises generating a rule specifying flexible gap sizes between adjacent ones of the implicit logical blocks determined based on the gap sizes computed for corresponding adjacent ones of the explicit logical blocks.

12. The method of claim 1, wherein the determining comprises identifying overlapping ones of the explicit logical blocks.

13. The method of claim 12, wherein the identifying comprises determining overlap of rectangular bounding boxes encompassing respective ones of the explicit logical blocks.

14. The method of claim 13, wherein the identifying comprises determining overlap of outline polygons corresponding to outlines of viewable regions of respective ones of the explicit logical blocks.

15. The method of claim 14, wherein the generating comprises generating a required rule specifying a fixed overlap of bounding boxes of explicit logical blocks with overlapping outline polygons to be preserved in overlap of bounding boxes of corresponding ones of the implicit logical blocks.

16. The method of claim 14, wherein the generating comprises generating a non-required rule specifying an overlap of bounding boxes of implicit logical blocks corresponding to explicit logical blocks with overlapping bounding boxes but non-overlapping outline polygons.

17. The method of claim 1, wherein the determining comprises identifying embedded ones of the explicit logical blocks.

18. The method of claim 17, wherein the identifying comprises determining overlap of rectangular bounding boxes encompassing respective ones of the explicit logical blocks.

19. The method of claim 18, wherein the identifying comprises determining overlap of outline polygons corresponding to outlines of viewable regions of respective ones of the explicit logical blocks.

20. The method of claim 19, wherein the generating comprises generating a required rule specifying a fixed embedding ratio for implicit logical blocks corresponding to explicit logical blocks with overlapping outline polygons.

21. The method of claim 19, wherein the generating comprises generating a non-required rule specifying an embedding ratio for implicit logical blocks corresponding to explicit logical blocks with overlapping bounding boxes but non-overlapping outline polygons.

22. The method of claim 1, wherein the determining comprises determining alignment relationships among the explicit logical blocks.

23. The method of claim 22, wherein the generating comprises generating rules specifying the alignment relationships among the implicit logical blocks based on the alignment relationships among corresponding ones of the explicit logical blocks.

24. The method of claim 23, wherein the generating additionally comprises associating with each rule a strength label in accordance with predefined horizontal and vertical alignment hierarchies.

25. The method of claim 22, wherein the determining comprises detecting adjacent ones of the explicit logical blocks that are aligned and have equal sizes along a layout dimension of the electronic document.

26. The method of claim 25, wherein the generating comprises generating a required rule preserving equal sizes along the layout dimension for adjacent ones of the implicit logical blocks corresponding to two or more detected adjacent explicit logical blocks.

27. The method of claim 22, wherein the determining comprises determining distances between ones of the explicit logical blocks assigned identical content styles.

28. The method of claim 27, wherein the generating comprises generating a non-required rule preserving the determined distances between corresponding ones of the implicit logical blocks.

29. The method of claim 1, wherein the determining comprises determining margins separating the explicit logical blocks from edges of the electronic document.

30. The method of claim 29, wherein the generating comprises generating a non-required rule preserving the margins on layouts of the implicit logical blocks.

31. The method of claim 1, wherein the determining comprises identifying ones of the explicit logical blocks with content bleeding over edges of the electronic document.

32. The method of claim 31, wherein the generating comprises generating a rule preserving the bleeding of content of the identified ones of the explicit logical blocks in corresponding ones of the implicit logical blocks.

33. A machine for processing an electronic document, comprising:
a computer-readable medium storing computer-readable instructions: and
a computer processor coupled to the computer-readable medium, operable to execute the instructions, and based at least in part on the execution of the instructions operable to perform operations comprising
extracting explicit logical blocks from the electronic document, each of the explicit logical blocks corresponding to a content region of the electronic document assigned a respective content style;
determining layout relationships among the explicit logical blocks;
based on the layout relationships, generating rules constraining layout variations among implicit logical blocks to approximate the electronic document in appearance while accommodating variable content, wherein each of the implicit logical blocks corresponds to a respective one of the explicit logical blocks and accommodates variable content having the content style assigned to the corresponding explicit logical block; and
storing the rules in a machine-readable medium.

34. A machine-readable medium storing machine-readable instructions that, when executed by a machine, cause the machine to perform operations comprising:
receiving explicit logical blocks extracted from the electronic document, each of the explicit logical blocks corresponding to a content region of the electronic document assigned a respective content style;

determining layout relationships among the explicit logical blocks;

based on the layout relationships, generate rules constraining layout variations among implicit logical blocks to approximate the electronic-document in appearance while accommodating variable content, wherein each of the implicit logical blocks corresponds to a respective one of the explicit logical blocks and accommodates variable content having the content style assigned to the corresponding explicit logical block; and storing the rules in a machine-readable medium.

* * * * *

UNITED STATES PATENT AND TRADEMARK OFFICE
CERTIFICATE OF CORRECTION

| | | |
|---|---|---|
| PATENT NO. | : 8,245,131 B2 | Page 1 of 1 |
| APPLICATION NO. | : 11/055744 | |
| DATED | : August 14, 2012 | |
| INVENTOR(S) | : Hui Chao et al. | |

It is certified that error appears in the above-identified patent and that said Letters Patent is hereby corrected as shown below:

In column 14, line 41, in Claim 33, delete "instructions:" and insert -- instructions; --, therefor.

In column 15, line 5, in Claim 34, delete "electronic-document" and insert -- electronic document --, therefor.

Signed and Sealed this
Fifth Day of February, 2013

Teresa Stanek Rea
*Acting Director of the United States Patent and Trademark Office*